(12) United States Patent
Zhao et al.

(10) Patent No.: US 10,592,735 B2
(45) Date of Patent: Mar. 17, 2020

(54) COLLABORATION EVENT CONTENT SHARING

(71) Applicant: Cisco Technology, Inc., San Jose, CA (US)

(72) Inventors: Qiujun Zhao, Hangzhou (CN); Bingjun Lyu, Hangzhou (CN); Qunfeng Chai, Hangzhou (CN); Lianqi You, Hangzhou (CN); Damien McCoy, Galway (IE)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/893,744

(22) Filed: Feb. 12, 2018

(65) Prior Publication Data
US 2019/0251342 A1    Aug. 15, 2019

(51) Int. Cl.
*H04N 7/14* (2006.01)
*G06K 9/00* (2006.01)
(Continued)

(52) U.S. Cl.
CPC ........ *G06K 9/00355* (2013.01); *H04L 65/403* (2013.01); *H04N 7/147* (2013.01); *H04N 7/15* (2013.01); *H04N 7/155* (2013.01)

(58) Field of Classification Search
CPC .............. G01S 5/0072; G06F 17/3028; G06K 9/00355; H04L 12/18; H04L 63/102; H04L 63/105; H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144;
(Continued)

(56) References Cited

U.S. PATENT DOCUMENTS 8,325,214 B2    12/2012   Hildreth
8,418,085 B2 *   4/2013   Snook ..................... G06F 3/017
                                                    715/863
(Continued)

OTHER PUBLICATIONS

GoCam by Crunchfish. 2017 available on the web at: https://itunes.apple.com/us/app/gocam-by-crunchfish/id883157865?mt=8.
(Continued)

*Primary Examiner* — Khai N. Nguyen

(57) ABSTRACT

In one embodiment, a system includes a processor, and a memory to store data used by the processor, wherein the processor is operative to detect a personalized content request or a personalized content capture attempt from at least one image of a video captured by a camera of a collaboration end-point during a collaboration event, visually identify a participant making the personalized content request or the personalized content capture attempt based on an image of the participant in the at least one image, and issue an instruction to send a content item or a link to the content item to a personalized collaboration space of the identified participant, the content item being a response to the personalized content request or the personalized content capture attempt. Related apparatus and methods are also described.

20 Claims, 8 Drawing Sheets

(51) Int. Cl.
*H04L 29/06* (2006.01)
*H04N 7/15* (2006.01)

(58) Field of Classification Search
CPC .......... H04N 7/147; H04N 7/148; H04N 7/15;
H04N 7/152; H04N 7/155; H04N 7/157;
H04N 7/23206; H04W 4/18; H04W 4/185
USPC ......... 348/14.01, 14.02, 14.03, 14.04, 14.05,
348/14.06, 14.07, 14.08, 14.09, 14.1,
348/14.11, 14.12, 14.13, 14.14, 15.15,
348/14.16; 382/275; 379/265.03;
455/414.1, 566; 704/270
See application file for complete search history.

(56) References Cited

U.S. PATENT DOCUMENTS

| | | | |
|---|---|---|---|
| 9,158,342 | B2 | 10/2015 | Cho et al. |
| 9,239,627 | B2 | 1/2016 | Kryze et al. |
| 9,836,458 | B1* | 12/2017 | Jiang ................ G06F 17/289 |
| 2006/0171515 | A1* | 8/2006 | Hintermeister ........ G06Q 10/10 |
| | | | 379/110.01 |
| 2010/0306670 | A1 | 12/2010 | Quinn et al. |
| 2012/0150863 | A1 | 6/2012 | Fish et al. |
| 2012/0204120 | A1* | 8/2012 | Lefar ................ G06Q 10/0631 |
| | | | 715/757 |
| 2012/0296979 | A1* | 11/2012 | Iwai ..................... H04L 65/403 |
| | | | 709/205 |
| 2013/0063537 | A1* | 3/2013 | Emori ................... H04N 7/147 |
| | | | 348/14.01 |
| 2013/0106981 | A1* | 5/2013 | Tsai .................... H04L 12/1813 |
| | | | 348/14.03 |
| 2013/0212182 | A1 | 8/2013 | Jhang et al. |
| 2013/0258042 | A1* | 10/2013 | Shun ..................... H04L 67/22 |
| | | | 348/14.08 |
| 2013/0265381 | A1* | 10/2013 | Ai ......................... H04L 65/605 |
| | | | 348/14.08 |
| 2014/0208211 | A1 | 7/2014 | Luo et al. |
| 2015/0007054 | A1 | 1/2015 | Qu et al. |
| 2015/0007057 | A1* | 1/2015 | Zhu ....................... H04L 65/403 |
| | | | 715/753 |
| 2015/0067327 | A1* | 3/2015 | Lipton .................. H04L 63/083 |
| | | | 713/168 |
| 2015/0067536 | A1 | 3/2015 | Leorin et al. |
| 2015/0373063 | A1* | 12/2015 | Vashishtha .......... H04L 65/1089 |
| | | | 348/14.07 |
| 2016/0073052 | A1* | 3/2016 | Wang .................. H04L 65/1086 |
| | | | 348/14.07 |
| 2017/0076400 | A1 | 3/2017 | Woo |
| 2017/0118271 | A1* | 4/2017 | Reyes ..................... H04L 67/06 |
| 2019/0073490 | A1* | 3/2019 | Agrawal ............. G06F 21/6254 |

OTHER PUBLICATIONS

12th IEEE International Conference on Automatic Face and Gesture Recognition—Pocket Guide; May 30-Jun. 3, 2017.

Babaei, Mahdi: "Gesture and Face Recognition for an interactive email System"; Conference Paper Sep. 2012; Conference: Conference. ICICM; available at: https://www.researchgate.net/publication/260146666_Gesture_and_Face_Recognition_for_an_Interactive_email_System.

Binh, Nguyen Dang; "Real-Time Hand Gesture and Face Recognition via T-CombP2DHMMs"; International Journal of Computational Vision and Biomechanics, vol. 2 No. 1, Jan.-Jun. 2016, p. 51-60.

Elproducente.com: DJI Spark Gesture Control—How to use it?: available on the web at: http://elproducente.com/dji-spark-gesture-control-how-to-use-it-review-manual/.

Gonzales, Neil; Snap Better Selfies Using Hand Gestures on Your iPhone; available on the web at: https://ios.gadgethacks.com/how-to/snap-better-selfies-using-hand-gestures-your-iphone-0151462/.

Kao, Yung-Wei et al.; "Integration of Face and Hand Gesture Recognition"; Conference: Conference: Third 2006 International Conference on Convergence and Hybrid Information Technology, A1 Busan, Korea.

Polycom 2017; Polycom RealPresence Media Suite.

RemoteMeeting.com; "Let's Remote Meeting!"; 2017; available on the web at: https://www.remotemeeting.com/en/features.

Verba, 2017; "Screen Capture for Quality Management"; available on the web at: http://www.verbs.com/screen-capturing.

TOMTOP, "DJI Spark Mini RC Selfie Drone—BNF", https://www.youtube.com/watch?v=sXtGX2fMRGg, Jun. 22, 2017.

\* cited by examiner

COLLABORATION EVENT CONTENT SHARING

TECHNICAL FIELD

The present disclosure generally relates to sharing collaboration event content.

BACKGROUND

Content, such as a slide deck or video content, is commonly shared in a conference room via a display surface for the participants in the collaboration event to view. When the collaboration event includes multiple sites and/or rooms, the content may be displayed on a display surface in each of the sites and/or rooms. Shared content is frequently photographed by meeting attendants for later perusal.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a system including a processor, and a memory to store data used by the processor, wherein the processor is operative to detect a personalized content request or a personalized content capture attempt from at least one image of a video captured by a camera of a collaboration end-point during a collaboration event, visually identify a participant making the personalized content request or the personalized content capture attempt based on an image of the participant in the at least one image, and issue an instruction to send a content item or a link to the content item to a personalized collaboration space of the identified participant, the content item being a response to the personalized content request or the personalized content capture attempt.

Detailed Description

Figure 1:
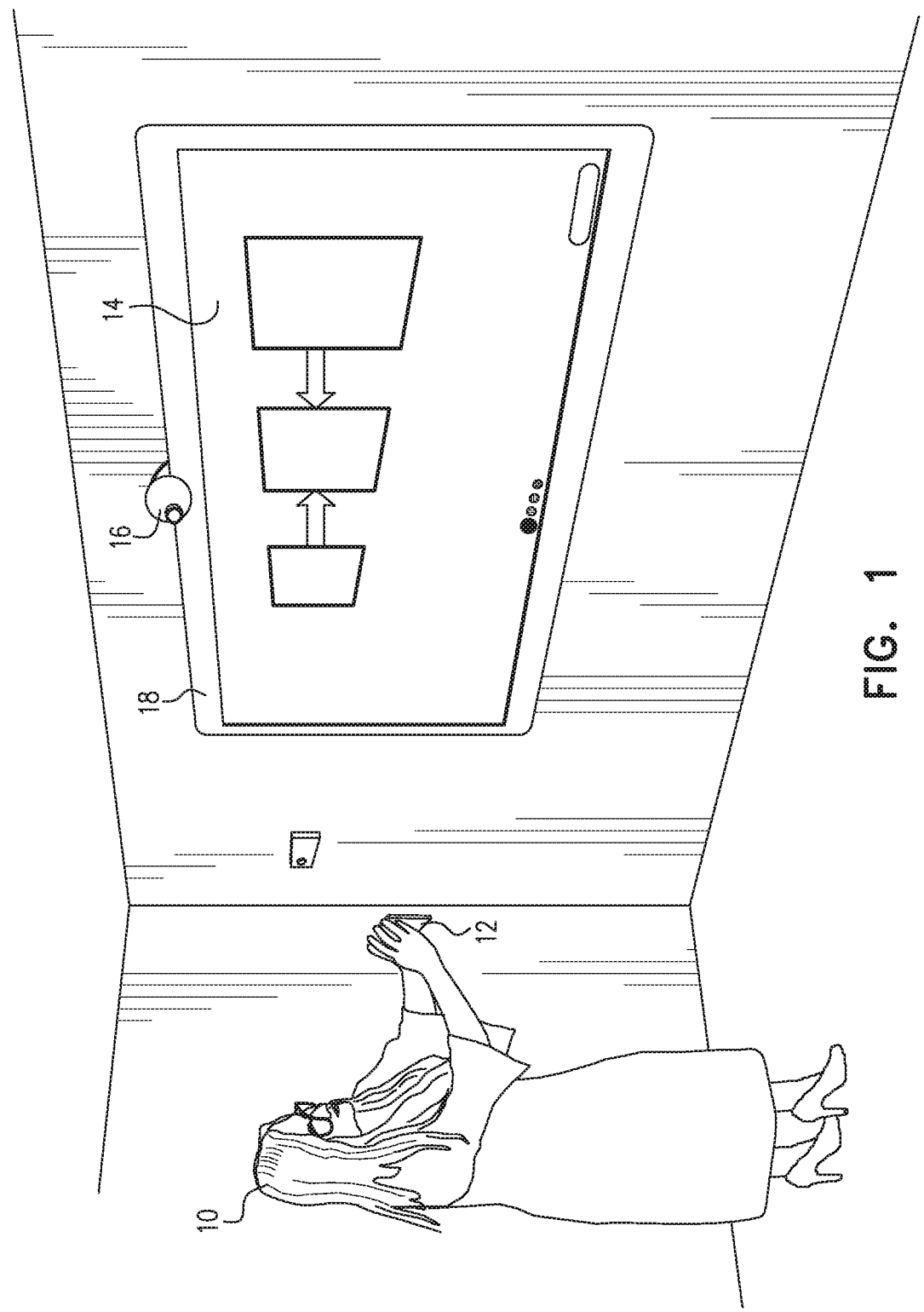
FIG. 1 is a pictorial view of a content capture attempt in accordance with an embodiment of the present disclosure.

Reference is now made to FIG. 1, which is a pictorial view of a content capture attempt in accordance with an embodiment of the present disclosure. FIG. 1 shows a participant 10 holding up a mobile phone 12 to take a photograph of a display surface 14 of a collaboration end-point 18 during a collaboration event. The collaboration end-point display surface 14 is displaying some content that the participant 10 wants to photograph. A collaboration system processing-element (not shown in FIG. 1) detects the screenshot capture attempt based on analyzing at least one image of a video captured by a camera 16 of the collaboration end-point 18 during the collaboration event. The screenshot capture attempt may be identified from a participant holding an image capturing apparatus (for example, but not limited to, a mobile phone, a tablet, or a camera) in the image(s) of the video.

Figure 2:
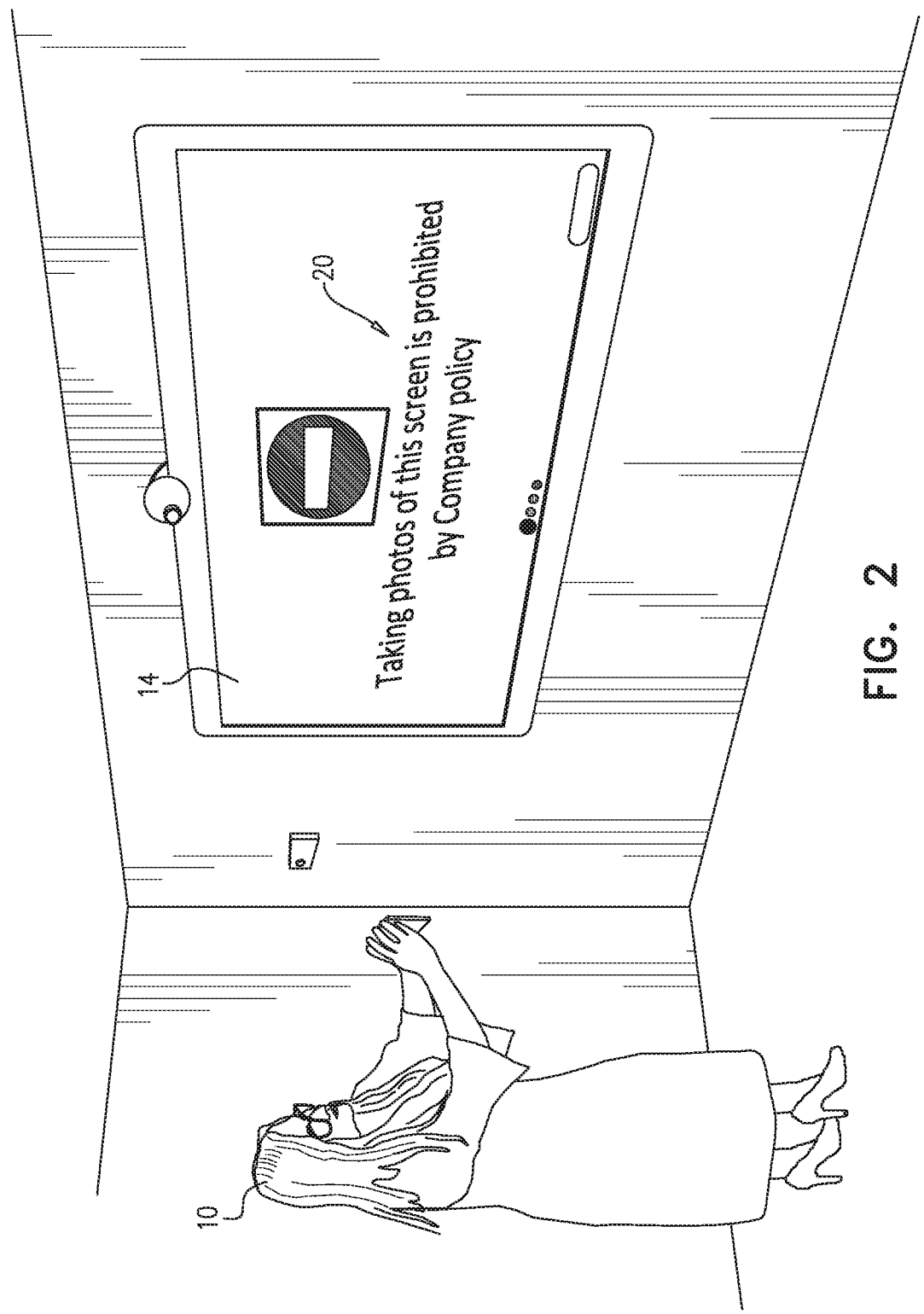
FIG. 2 is a pictorial view of content capture denial in accordance with an embodiment of the present disclosure.

Reference is now made to FIG. 2, which is a pictorial view of content capture denial in accordance with an embodiment of the present disclosure. If screenshot capture is not permitted, the processing element is operative to issue an instruction to remove the content being displayed on the display surface 14 from the display surface 14 and issue an instruction to output a message 20 to the display surface 14 about the screenshot capture not being permitted. It will be appreciated that the message 20 included on the display surface 14 in the example of FIG. 2, is exemplary, and any suitable message regarding taking photographs being forbidden is contemplated. The message 20 may be removed after a predetermined delay and the content that was previously displayed on the display surface 14 may be displayed again.

Figure 3:
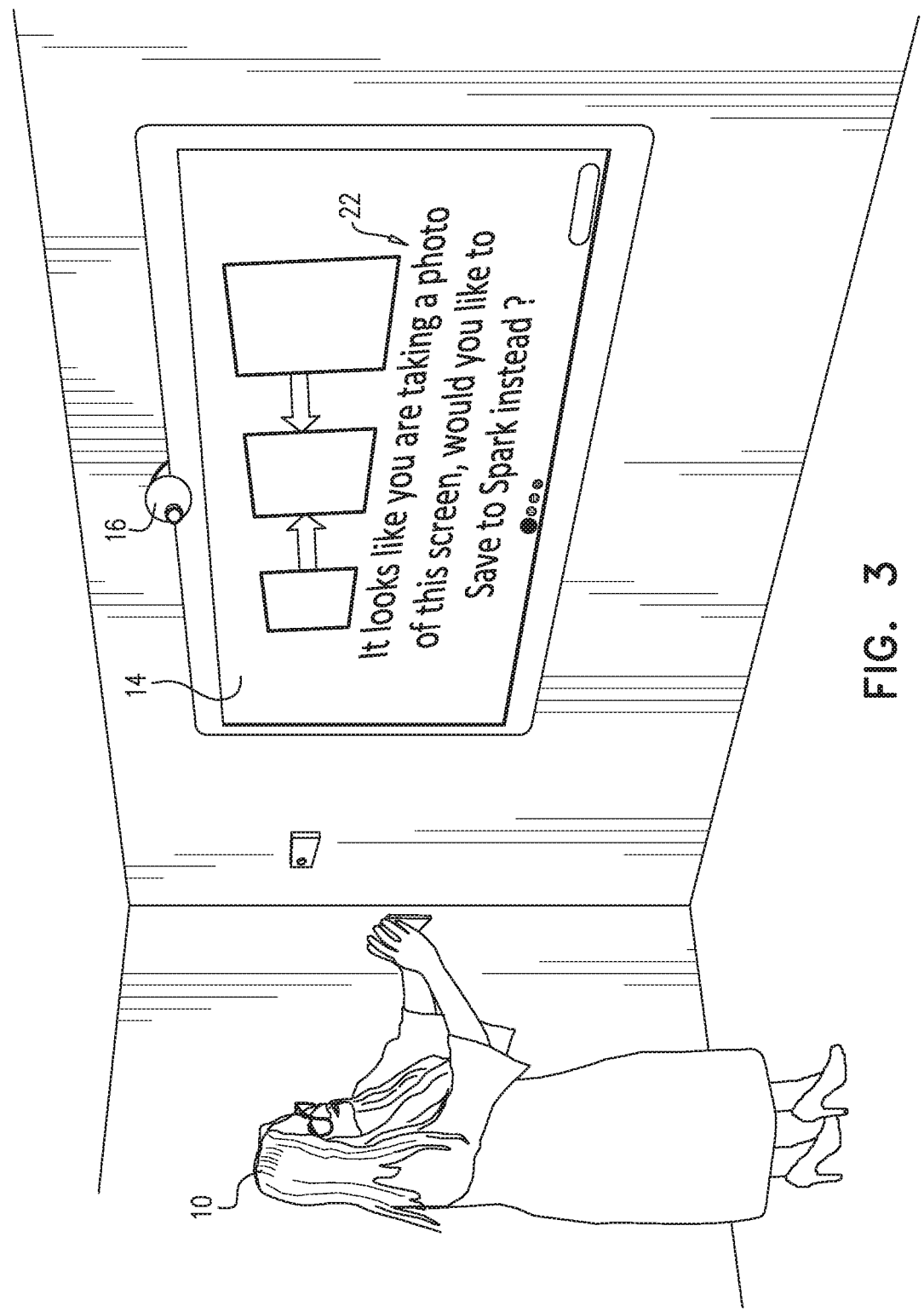
FIG. 3 is a pictorial view of a content capture prompt in accordance with an embodiment of the present disclosure.

Reference is now made to FIG. 3, which is a pictorial view of a content capture prompt in accordance with an embodiment of the present disclosure. If screenshot capture is permitted, the processing element is operative to output a message 22 for display on the display surface 14 asking if a participant in the collaboration event wants to receive a screenshot of the content displayed on the display surface 14. If a participant confirms the request, the processing element is operative to prepare a screenshot from the content being displayed on the display surface 14 and send the prepared screenshot or a link to the prepared screenshot to a collaboration space of one or more of the participants of the collaboration event. In some embodiments of the present disclosure, the participant 10 who is attempting to take the photograph is identified from the image(s) of the video captured by the camera 16 and the prepared screenshot is sent to a personal collaboration space of the participant 10. The collaboration space may include any of the following by way of example only: email; instant message (IM); chat room; or Spark™ room. In some embodiments of the present disclosure, the prepared screenshot is send to a shared collaboration space, e.g., a chat room or Cisco Spark™ room, of two or more of the participants in the collaboration event.

Figure 4:
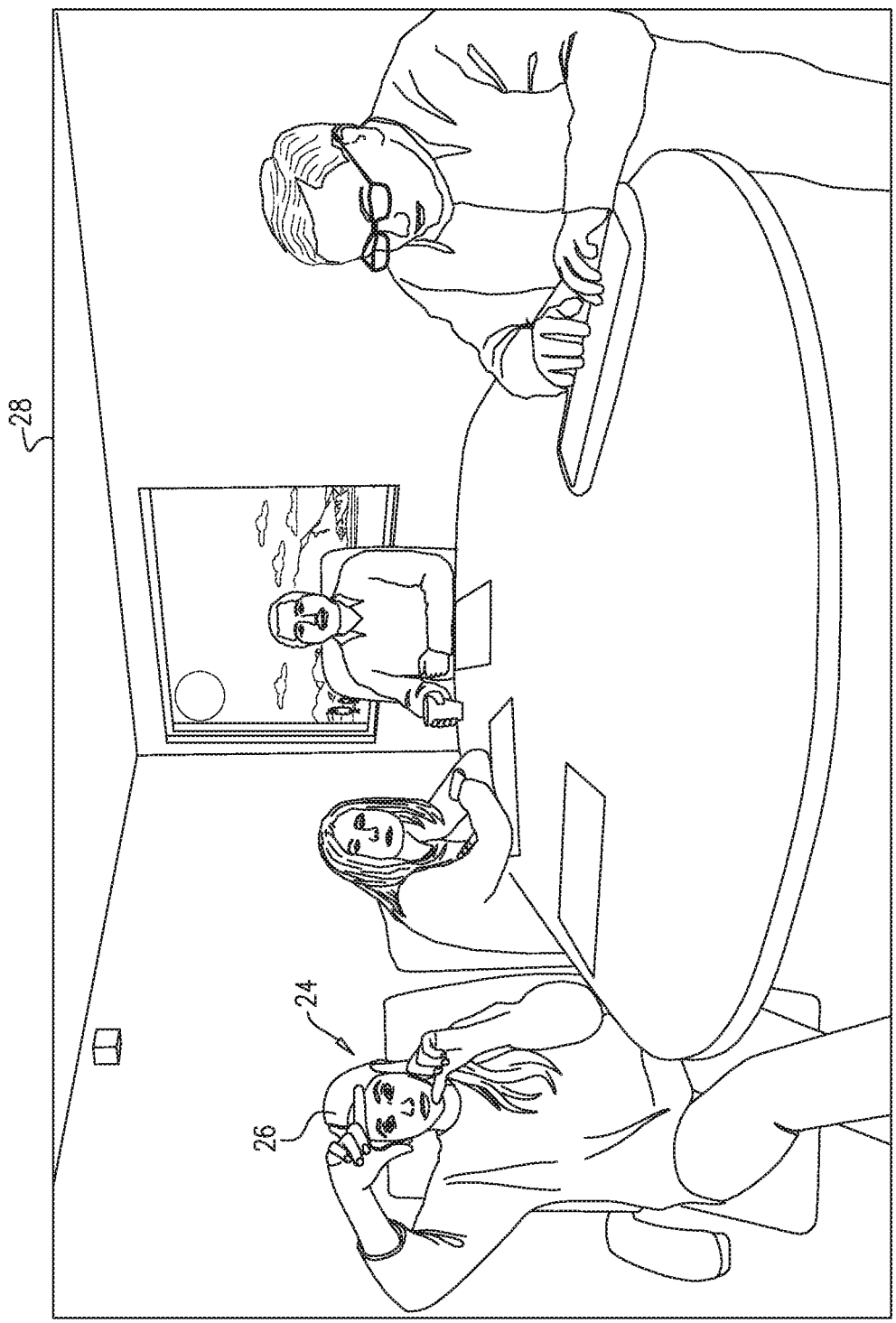
FIG. 4 is a pictorial view of a first content capture request in accordance with an embodiment of the present disclosure.

Reference is now made to FIG. 4, which is a pictorial view of a first content capture request 24 in accordance with an embodiment of the present disclosure. FIG. 4 shows an image 28 captured by the camera 16 (FIG. 1) including a participant 26 in a collaboration event making a gesture as part of the content capture request 24 in order to request a screenshot from content being displayed on the display surface 14 (FIG. 1) of the collaboration end-point 18 (FIG. 1). The exemplary gesture shown in FIG. 4 is of the participant 26 forming a square with her hands alluding to holding a camera. It will be appreciated that the gesture may take any suitable form.

The collaboration system processing-element (not shown) is operative to detect a personalized content request (e.g., the content capture request 24) from at least one image (e.g., the image 28) of video captured by the camera 16 during the collaboration event. The personalized content request is identified from a gesture of the participant 26 in the image(s) of the captured video. The processing element is optionally operative to visually identify the participant 26 making the personalized content request based on an image of the participant 26 in the image(s) of the captured video. The processing element is operative to prepare a content item (e.g., a screenshot) and save the content item to a memory and then issue an instruction to send the content item, or a link to the content item, to the personalized collaboration space of the identified participant (if identified) and/or to a shared collaboration space of two or more of the participants of the collaboration event. The content item is a response to the personalized content request and in the example of FIG. 4, the content item is a screenshot from content being displayed on the display surface 14 at a time when the personalized content request is detected in the image(s) of the captured video.

Figure 5:
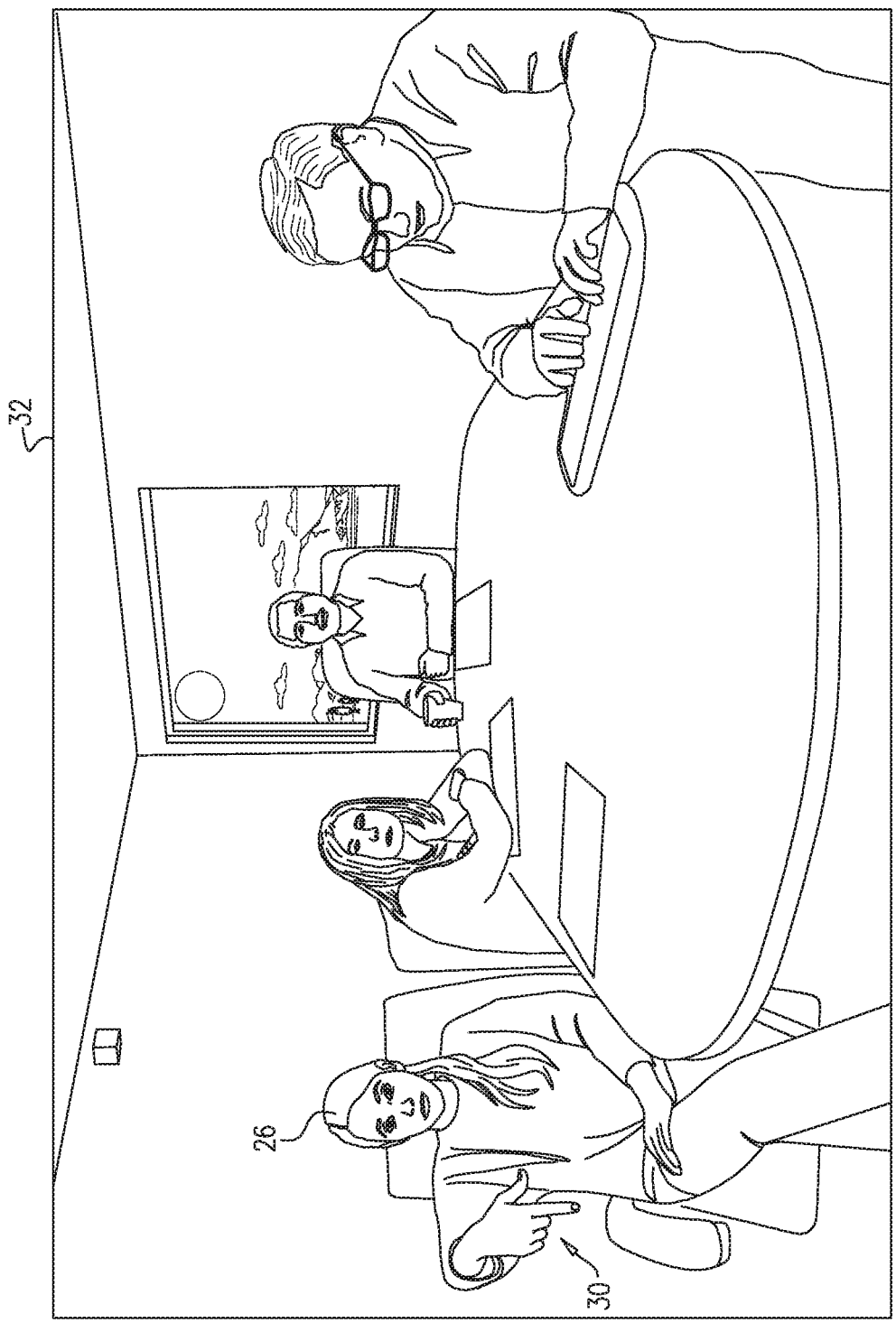
FIG. 5 is a pictorial view of a second content capture request in accordance with an embodiment of the present disclosure.

Reference is now made to FIG. 5, which is a pictorial view of a second content capture request 30 in accordance with an embodiment of the present disclosure. FIG. 5 shows an image 32 captured by the camera 16 of FIG. 1 including the participant 26 in a collaboration event making a gesture as part of the content capture request 30 in order to request a file (e.g. document file, or slide deck file) which is being shared on the display surface 14 (FIG. 1) of the collaboration end-point 18 (FIG. 1). The exemplary gesture shown in FIG. 5 is of the participant 26 pointing her fingers downwards alluding to a file download request. The participant 26 making the gesture may optionally be identified. It will be appreciated that the gesture may take any suitable form. The processing element is operative to send a content item (e.g. the file being shared in the collaboration event at a time when the personalized content request is detected in the image(s) in the captured video), or a link to the content item, to the personalized collaboration space of the identified participant (if identified) and/or to a shared collaboration space of two or more of the participants of the collaboration event.

Figure 6:
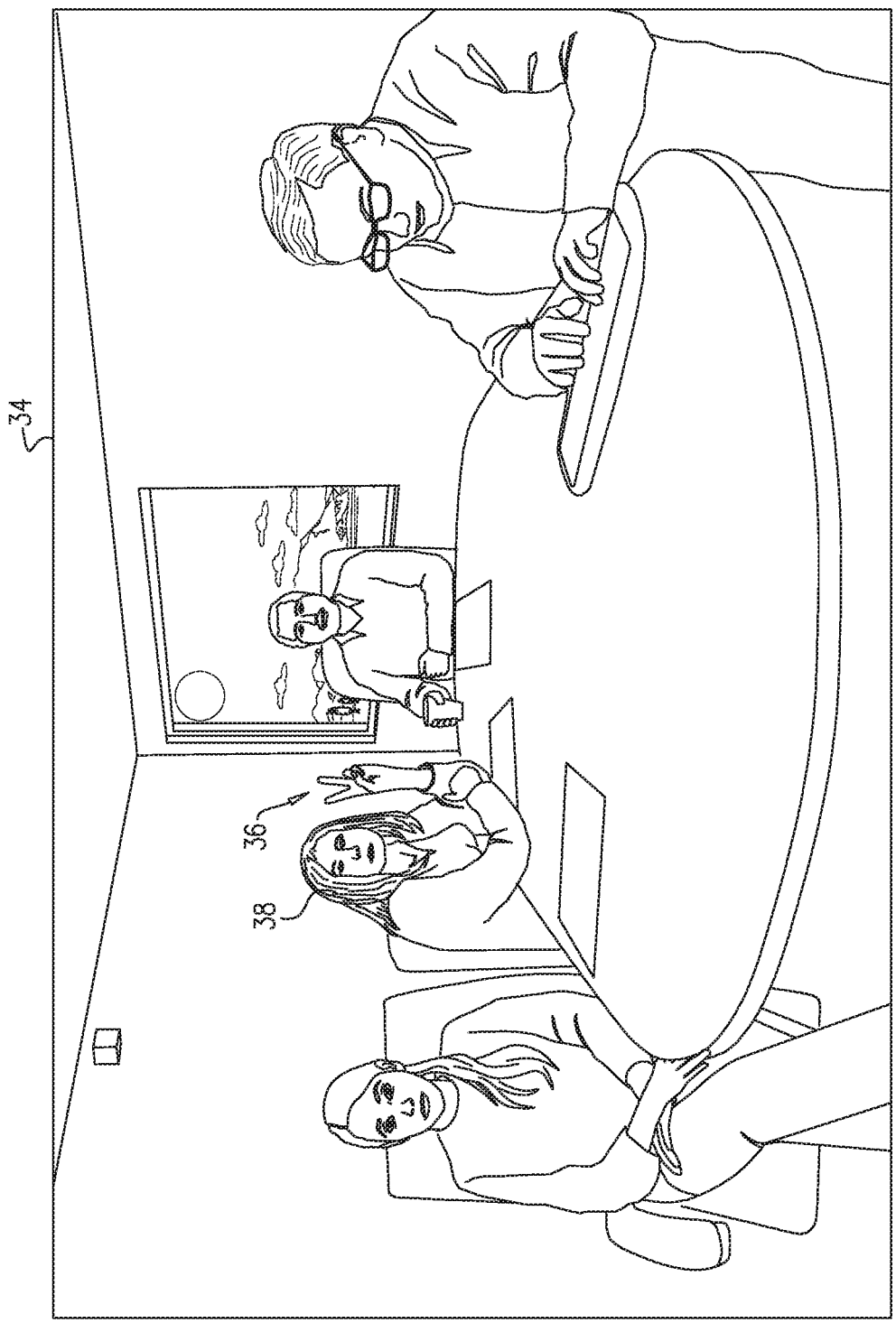
FIG. 6 is a pictorial view of a third content capture request in accordance with an embodiment of the present disclosure.

Reference is now made to FIG. 6, which is a pictorial view of a third content capture request 36 in accordance with an embodiment of the present disclosure. FIG. 6 shows an image 34 captured by the camera 16 of FIG. 1 including a participant 38 in a collaboration event making a gesture as part of the content capture request 36 in order to add a bookmark to a recording of the collaboration event. The exemplary gesture shown in FIG. 6 is of the participant 38 pointing her fingers upwards alluding to adding a bookmark. The participant 38 making the gesture may optionally be identified. It will be appreciated that the gesture may take any suitable form. The processing element is operative to insert the bookmark in the recording of the collaboration event. The processing element is operative to send a content item (e.g. the recording of the collaboration event including the bookmark inserted in the recording, corresponding to a time when the content capture request 36 is detected in the image 34), or a link to the content item, to the personalized collaboration space of the identified participant (if identified) and/or to a shared collaboration space of two or more of the participants of the collaboration event. The bookmark may be inserted into the recording of the collaboration event for the participant who requested the bookmark, or may be inserted into the recording of the collaboration event for all the participants.

Figure 7:
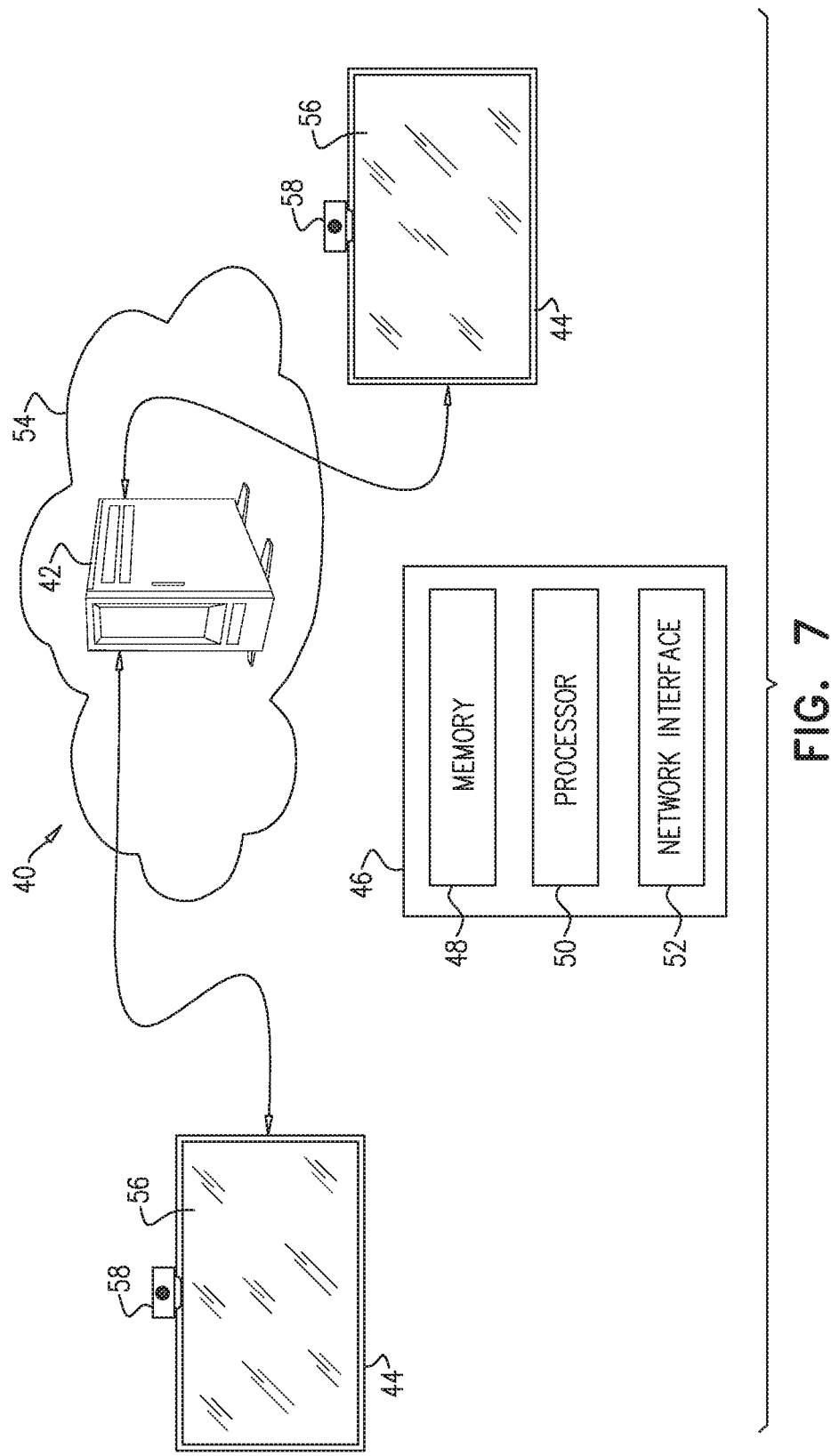
FIG. 7 is a block diagram view of a collaboration system constructed and operative in accordance with an embodiment of the present disclosure.

Reference is now made to FIG. 7, which is a block diagram view of a collaboration system 40 constructed and operative in accordance with an embodiment of the present disclosure. The collaboration system 40 includes at least one collaboration server 42 and at least two collaboration end-points 44. Each collaboration end-point 44 includes a display surface 56 and a camera 58. One or more of the collaboration end-points 44 may include one or more digital white boards. The collaboration system 40 includes a content capture apparatus 46 including a memory 48, a processor 50, and a network interface 52. The memory 48 stores data used by the processor 50 including software programs executed by the processor 50. The processor 50 is an example of the processing element described earlier and is described in more detail with reference to FIG. 8. The network interface 52 sends and receives data, to and from, the different elements of the collaboration system 40 via a network 54. The content capture apparatus 46 may be disposed in one or more of the collaboration server(s) 42, in one or more of the collaboration end-points 44 or at any other suitable location in the collaboration system 40.

Figure 8:
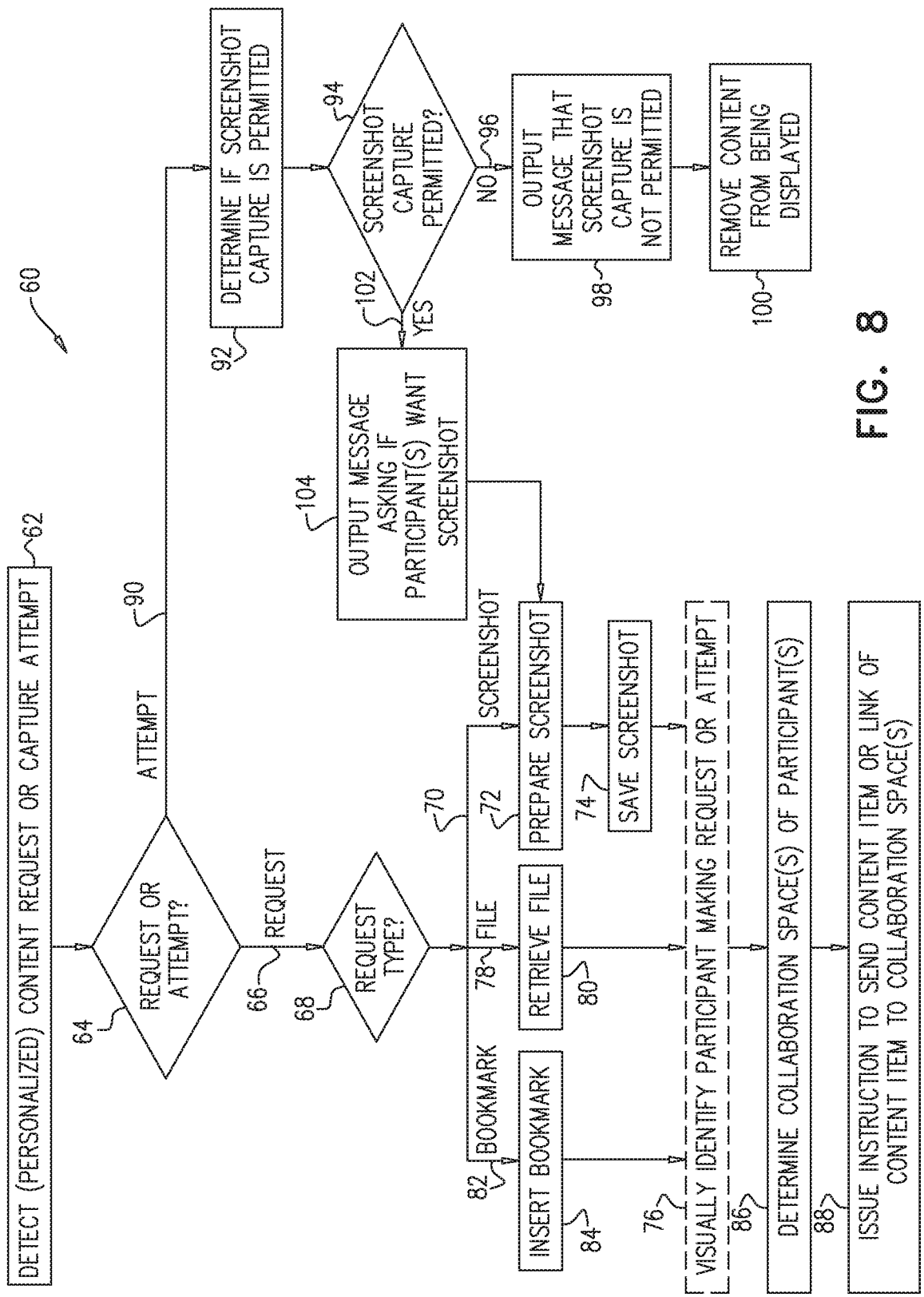
FIG. 8 is a flow chart including exemplary steps in a method of operation of the system of FIG. 7.

Reference is now made to FIG. 8, which is a flow chart 60 including exemplary steps in a method of operation of the system 40 of FIG. 7. Reference is also made to FIG. 7.

The processor 50 is operative to detect (block 62) a personalized content request or a personalized content capture attempt (e.g., screenshot capture attempt) from at least one image of a video captured by the camera 58 of one of the collaboration end-points 44 during a collaboration event. It will be appreciated that when the individual making the request is not identified in the method, the personalized content request or the personalized content capture attempt is better described as a content request or a content capture attempt as the personal aspect of the request or attempt is removed. The collaboration event may be with participants in the same conference room using the display surface 56 for presentations and sharing content, or the collaboration event may be with participants in multiple locations. The personalized content request may be identified from a gesture of a participant in the image(s) captured by the camera 58 of the collaboration end-points 44. Different gestures may be defined by the collaboration system 40 to correspond to different content requests. Gestures may be identified in the images using image recognition techniques for example: using machine-learning techniques based on ingesting many examples images of a particular gesture so that the collaboration system 40 may then identify that gesture; or by defining the geometry of a gesture, which may then be used to search the images for a similar geometry. The personalized content (e.g., screenshot) capture attempt may be identified from a participant holding an image capturing apparatus (e.g., camera or mobile phone) in the image(s) of the video captured by the camera 58. A participant holding a camera may be identified in the images using image recognition techniques for example: using machine-learning techniques based on feeding many examples images of a participant holding a camera; or by defining the geometry of a participant holding a camera, which may then be used to search the images for a similar geometry. It should be noted that when a conference room includes more than one display surface 56, the collaboration system 40 might determine which display surface 56 the participant is making a gesture towards based on a stance of the participant with respect to the camera 58 of each of the display surfaces 56.

At a decision block 64, the method may follow a request "path" (branch 66) if a content request was detected or an attempt "path" (branch 90) if a capture attempt was detected.

The request "path" is described first. At a decision block 68, the request type is used to determine which "path" in the flowchart 60 is followed.

If the request type is for a screenshot, then a branch 70 is followed in the flowchart 60. The processor 50 is operative to prepare a screenshot (block 72) from content being displayed on the display surface 56 at a time when the (personalized) content request is detected in the image(s) captured by the camera 58. The processor 50 is then operative to save the screenshot to the memory 48 (block 74).

If the request is for a file, then a branch 78 is followed in the flowchart 60. The processor 50 is operative to retrieve a file being shared in the collaboration event at a time when the (personalized) content request is detected in the image(s) captured by the camera 58 (block 80).

If the request is to add a bookmark, then a branch 82 is followed in the flowchart 60. The processor 50 is operative to insert the bookmark in the recording of the collaboration event (block 84) corresponding to a time when the (personalized) content request is detected in the image(s) captured by the camera 58.

The processor 50 is then optionally operative to visually identify a participant making the personalized content request based on an image of the participant in the image(s) captured by the camera 58 (block 76). The visual identification may be performed by comparing an image of the participant who is making the gesture with known images, for example, but not limited to, images stored in a company directory database. In accordance with an alternative embodiment of the present disclosure, the personalized content request may be made verbally by a participant. In accordance with the alternative embodiment, the participant making the personalized content request may be identified based on a known voice pattern of the participant.

The processor 50 is operative to determine a collaboration space or spaces of the participants (block 86). The collaboration space includes any of the following: email; instant message; chat room; or Spark room. The collaboration space may be a shared collaboration space of at least two of the participants of the collaboration event (for example, based on details of the participants known to the collaboration system 40 at the time the collaboration event was setup). The collaboration event may be a personal collaboration space of one of the participants of the collaboration event, for example, the participant making the gesture of the content request. The processor 50 may determine a default collaboration space based on a default collaboration space contact method listed in the company directory database, by way of example only.

The processor 50 is operative to issue an instruction to send a content item (e.g., screenshot, file and/or recording), or send a link to the content item, to a personalized collaboration space of the identified participant and/or to a shared collaboration space of at least two of the participants of the collaboration event (block 88). The content item is a response to the personalized content request. When branch 70 is followed, the content item is a screenshot from content being displayed on the display surface 56 at a time when the (personalized) content request is detected in the image(s) capture by the camera 58. When branch 78 is followed, the content item is a file being shared in the collaboration event at a time when the (personalized) content request is detected in the image(s) capture by the camera 58. When branch 82 is followed, the content item is a recording of the collaboration event including a bookmark inserted in the recording corresponding to a time when the (personalized) content request is detected in the image(s) capture by the camera 58.

Returning to decision block 64, in response to detecting a capture attempt, the attempt "path" (branch 90) is now described. The processor 50 is operative to determine whether screenshot capture is permitted (block 92). The processor 50 may be operative to determine whether screenshot capture is permitted based on a flag set for the collaboration event (e.g., when the collaboration event was setup) or based on a flag set for the content (e.g., in the properties of the content file) being shared in the collaboration event, or based on text (e.g., confidential or restricted content) included in the content being shared in the collaboration event.

At a decision block 94, the method may follow a branch 96 if screenshot capture is not permitted and a branch 102 if screenshot capture is permitted. The processing along the branch 96 is first described.

In response to detecting the screenshot capture attempt, if screenshot capture is not permitted, the processor 50 is operative to issue an instruction to output a message to the display surface 56 about the screenshot capture not being permitted (block 98) and remove the content being displayed on the display surface from the display surface 56 (block 100). After a predetermined delay, the message may be removed and the content that was previously displayed may be returned to the display surface 56. In accordance with some embodiments, the processor 50 is operative to identify the participant making the capture attempt and send a command to the device that the participant is using to take the photo and cause the device to vibrate as a warning to the participant.

The processing along the branch 102 is now described. In response to detecting the screenshot capture attempt, if screenshot capture is permitted, the processor 50 is operative to output a message for display on the display surface 56 asking if the participant/participants wants/want to receive a screenshot from content being displayed on the display surface 56 (block 104). The processor 50 is operative to prepare a screenshot (block 72) from content being displayed on the display surface 56 at a time when the (personalized) content capture attempt is detected in the image(s) captured by the camera 58. The processor 50 is then operative to save the screenshot to the memory 48 (block 74). It will be appreciated that the steps of blocks 72 and 74 are typically performed prior to a participant responding to the message output in the step of block 104. However, it will be appreciated that the steps of blocks 72 and 74 as well as any of the other steps in the flowchart 60 may be performed in any suitable order. The processor 50 waits for a response from the participant(s) to the question in the message and the processor 50 typically performs the steps of blocks 76, 86, and 88 if the response from the participant(s) is positive. In accordance with some embodiments, the collaboration end-point 44 may include a button or other user input feature (e.g., a touchscreen feature) for copying the contents of the display surface 56 to a collaboration space or spaces of the participant(s) thereby responding to the question in the message. The message may include an indication, such as an arrow pointing towards the button or other user input feature. In accordance with some embodiments, the collaboration end-point 44 may be operative to accept a verbal response from the participants, for example, "please save the screen to Spark" or "please send the screenshot by email to me" or "please send the screenshot by IM to John Smith" thereby responding to the question in the message. In accordance with some embodiments, the collaboration end-point 44 may be operative to accept a gesture, such as a thumbs or a nod of the head or other suitable gesture, thereby responding to the question in the message. The gesture may be indicative of the mode of collaboration.

The processor 50 is optionally operative to visually identify a participant making the personalized content capture attempt based on an image of the participant in the image(s) captured by the camera 58 (block 76). The processor 50 is operative to determine a collaboration space or spaces of the participant(s) (block 86). The collaboration space includes any of the following: email; instant message; chat room; or Spark room. The processor 50 is operative to issue an instruction to send the screenshot, or send a link to the screenshot, to a personalized collaboration space of the identified participant and/or to a shared collaboration space of at least two of the participants of the collaboration event (block 88).

There is also provided in accordance with another embodiment of the present disclosure, a system including a processor, and a memory to store data used by the processor, wherein the processor is operative to detect a screenshot capture attempt from at least one image of a video captured by a camera of a collaboration end-point during a collaboration event, in response to detecting the screenshot capture attempt if screenshot capture is permitted, prepare a first screenshot from content being displayed on a display surface and send the first screenshot or a link to the first screenshot to a collaboration space of at least one of the participants of the collaboration event, and if screenshot capture is not permitted, issue an instruction to output a message to the display surface about the screenshot capture not being permitted.

Further in accordance with an embodiment of the present disclosure if screenshot capture is not permitted, the processor is operative to issue an instruction to remove the content being displayed on the display surface from the display surface.

Still further in accordance with an embodiment of the present disclosure, in response to detecting the screenshot capture attempt, if screenshot capture is permitted, the processor is operative to output a message for display on the display surface asking if the at least one participant wants to receive the first screenshot.

Additionally in accordance with an embodiment of the present disclosure, the screenshot capture attempt is identified from a participant holding an image capturing apparatus in the at least one image.

Moreover in accordance with an embodiment of the present disclosure, the processor is operative to determine whether screenshot capture is permitted based on a flag set for the collaboration event.

Further in accordance with an embodiment of the present disclosure, the processor is operative to determine whether screenshot capture is permitted based on a flag set for the content being shared in the collaboration event.

Still further in accordance with an embodiment of the present disclosure, the processor is operative to determine whether screenshot capture is permitted based on text included in the content being shared in the collaboration event.

Additionally in accordance with an embodiment of the present disclosure, the system includes the collaboration end-point, which includes the processor.

Moreover in accordance with an embodiment of the present disclosure, the system includes a collaboration server serving at least two collaboration end-points, the processor being disposed in the collaboration server.

Further in accordance with an embodiment of the present disclosure, the collaboration space includes any of the following email, instant message, chat room, or Spark room.

Still further in accordance with an embodiment of the present disclosure, the collaboration space is a shared collaboration space of at least two of the participants of the collaboration event, or a personal collaboration space of one of the participants of the collaboration event.

There is also provided in accordance with still another embodiment of the present disclosure, a method including detecting a screenshot capture attempt from at least one image of a video captured by a camera of a collaboration end-point during a collaboration event, in response to detecting the screenshot capture attempt if screenshot capture is permitted, preparing a first screenshot from content being displayed on a display surface and sending the first screenshot or a link to the first screenshot to a collaboration space of at least one of the participants of the collaboration event, and if screenshot capture is not permitted, issuing an instruction to output a message to the display surface about the screenshot capture not being permitted.

Additionally in accordance with an embodiment of the present disclosure, the method includes, if screenshot capture is not permitted, issuing an instruction to remove the content being displayed on the display surface from the display surface.

Moreover in accordance with an embodiment of the present disclosure, the method includes, in response to detecting the screenshot capture attempt, if screenshot capture is permitted, outputting a message for display on the display surface asking if the at least one participant wants to receive the first screenshot.

Further in accordance with an embodiment of the present disclosure the screenshot capture attempt is identified from a participant holding an image capturing apparatus in the at least one image.

Still further in accordance with an embodiment of the present disclosure, the method includes determining whether screenshot capture is permitted based on a flag set for the collaboration event.

Additionally in accordance with an embodiment of the present disclosure, the method includes determining whether screenshot capture is permitted based on a flag set for the content being shared in the collaboration event.

Moreover in accordance with an embodiment of the present disclosure, the method includes determining whether screenshot capture is permitted based on text included in the content being shared in the collaboration event.

Further in accordance with an embodiment of the present disclosure the collaboration space includes any of the following email, instant message, chat room, or Spark room.

There is also provided in accordance with yet another embodiment of the present disclosure a software product, including a non-transient computer-readable medium in which program instructions are stored, which instructions, when read by a central processing unit (CPU), cause the CPU to detect a screenshot capture attempt from at least one image of a video captured by a camera of a collaboration end-point during a collaboration event, in response to detecting the screenshot capture attempt if screenshot capture is permitted, prepare a first screenshot from content being displayed on a display surface and send the first screenshot or a link to the first screenshot to a collaboration space of at least one of the participants of the collaboration event, and if screenshot capture is not permitted, issue an instruction to output a message to the display surface about the screenshot capture not being permitted.

In practice, some or all of these functions of the processor 50 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination. It will be appreciated by persons skilled in the art that the present disclosure is not limited by what has been particularly shown and described hereinabove. Rather the scope of the disclosure is defined by the appended claims and equivalents thereof.

What is claimed is:

1. A system comprising a processor and a memory to store data used by the processor, wherein the processor is operative to:
   detect, when content is being displayed by a collaboration end-point, a personalized content request or a personalized content capture attempt from at least one image of a video captured by a camera of the collaboration end-point during a collaboration event, by identifying in the at least one image a gesture of a participant indicative of a request for a screenshot of the content being displayed by the collaboration end-point, or by identifying in the at least one image an attempt of a participant to capture, with an image capturing device, the content being displayed by the collaboration end-point;
   visually identify the participant making the personalized content request or the personalized content capture attempt based on an image of the participant in the at least one image;
   generate, in response to detection of the personalized content request or the personalized content capture attempt, a screenshot from the content being displayed by the collaboration end-point at a time when the personalized content request or the personalized content capture attempt is detected; and
   issue an instruction to send the screenshot or a link to the screenshot to a personalized collaboration space of the participant.

2. The system according to claim 1, wherein identifying in the at least one image the attempt of the participant to capture, with the image capturing device, the content being displayed by the collaboration end-point comprises identifying the participant holding the image capturing device in the at least one image.

3. The system according to claim 1, wherein the processor is operative to:
   prepare the screenshot;
   save the screenshot to the memory; and
   send the screenshot to the personalized collaboration space of the participant.

4. The system according to claim 1, wherein the processor is operative to issue an instruction to send a file being shared in the collaboration event at the time when the personalized content request or a personalized content capture attempt is detected.

5. The system according to claim 1, wherein the processor is operative to issue an instruction to send a recording of the collaboration event including a bookmark inserted in the recording corresponding to the time when the personalized content request is detected.

6. The system according to claim 5, wherein the processor is operative to:
   insert the bookmark in the recording of the collaboration event; and
   send the recording of the collaboration event, or a link to the recording of the collaboration event, to the personalized collaboration space of the participant.

7. The system according to claim 1, further comprising the collaboration end-point, which includes the processor.

8. The system according to claim 1, further comprising a collaboration server serving at least two collaboration end-points, the processor being disposed in the collaboration server.

9. The system according to claim 1, wherein the processor is operative to determine that screenshot capture is permitted prior to issuing the instruction to send the screenshot or the link to the screenshot to the personalized collaboration space of the participant.

10. The system according to claim 1, wherein the processor is operative to:
    determine that screenshot capture is not permitted; and
    in response to a determination that screenshot capture is not permitted, remove the content being displayed by the collaboration end-point when it is determined that screenshot capture is not permitted.

11. The system according to claim 10, wherein the processor is operative to:
    remove the content being displayed by the collaboration end-point for a predetermined amount of time from when it is determined that screenshot capture is not permitted; and
    re-display the content after the predetermined amount of time has elapsed.

12. A method comprising:
    detecting, when content is being displayed by a collaboration end-point, a personalized content request or a personalized content capture attempt from at least one image of a video captured by a camera of the collaboration end-point during a collaboration event, by identifying in the at least one image a gesture of a participant indicative of a request for a screenshot of the content being displayed by the collaboration end-point, or by identifying in the at least one image an attempt of a participant to capture, with an image capturing device, the content being displayed by the collaboration end-point;

visually identifying the participant making the personalized content request or the personalized content capture attempt based on an image of the participant in the at least one image;

generating, in response to detection of the personalized content request or the personalized content capture attempt, a screenshot from the content being displayed at the collaboration end-point at a time when the personalized content request or the personalized content capture attempt is detected; and issuing an instruction to send the screenshot or a link to the screenshot to a personalized collaboration space of the participant.

13. The method according to claim 12, wherein identifying in the at least one image the attempt of the participant to capture, with the image capturing device, the content being displayed by the collaboration end-point comprises identifying the participant holding the image capturing device in the at least one image.

14. The method according to claim 12, further comprising issuing an instruction to send a file being shared in the collaboration event at the time when the personalized content request or a personalized content capture attempt is detected.

15. The method according to claim 12, further comprising issuing an instruction to send a recording of the collaboration event including a bookmark inserted in the recording corresponding to the time when the personalized content request is detected.

16. The method according to claim 12, further comprising determining whether screenshot capture is permitted prior to the issuing of the instruction to send the screenshot or the link to the screenshot to the personalized collaboration space of the participant.

17. The method of claim 12, further comprising:
determining that screenshot capture is not permitted; and
in response to determining that screenshot capture is not permitted, removing the content being displayed by the collaboration end-point when it is determined that screenshot capture is not permitted.

18. The method of claim 17, wherein removing the content being displayed by the collaboration end-point when it is determined that screenshot capture is not permitted comprises removing the content for a predetermined amount of time from when it is determined that screenshot capture is not permitted, and re-displaying the content after the predetermined amount of time has elapsed.

19. A software product, comprising a non-transitory computer-readable medium in which program instructions are stored, which instructions, when read by a central processing unit (CPU), cause the CPU to:

detect, when content is being displayed by a collaboration end-point, a personalized content request or a personalized content capture attempt from at least one image of a video captured by a camera of the collaboration end-point during a collaboration event, by identifying in the at least one image a gesture of a participant indicative of a request for a screenshot of the content being displayed by the collaboration end-point, or by identifying in the at least one image an attempt of a participant to capture, with an image capturing device, the content being displayed by the collaboration end-point;

visually identify the participant making the personalized content request or the personalized content capture attempt based on an image of the participant in the at least one image;

generate, in response to detection of the personalized content request or the personalized content capture attempt, a screenshot from the content being displayed at the collaboration end-point at a time when the personalized content request or the personalized content capture attempt is detected; and issue an instruction to send the screenshot or a link to the screenshot to a personalized collaboration space of the participant.

20. The software product of claim 19, wherein the instructions, when read by the CPU, cause the CPU to:
determine that screenshot capture is not permitted; and
in response to a determination that screenshot capture is not permitted, remove the content being displayed by the collaboration end-point when it is determined that screenshot capture is not permitted.

\* \* \* \* \*